US010325126B2

(12) United States Patent
Calvarese et al.

(10) Patent No.: US 10,325,126 B2
(45) Date of Patent: Jun. 18, 2019

(54) BULK RADIO FREQUENCY IDENTIFICATION TAG READING

(71) Applicant: SYMBOL TECHNOLOGIES, LLC, Lincolnshire, IL (US)

(72) Inventors: Russell Calvarese, Stony Brook, NY (US); Richard J. Lavery, Huntington, NY (US); Rehan K. Jaffri, New York, NY (US); Charles G. Lauria, Miller Place, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/720,257

(22) Filed: Sep. 29, 2017

(65) Prior Publication Data

US 2019/0102587 A1    Apr. 4, 2019

(51) Int. Cl.
*G06K 7/08* (2006.01)
*G06K 7/10* (2006.01)
*G06K 7/14* (2006.01)
*G06Q 20/20* (2012.01)

(52) U.S. Cl.
CPC ..... *G06K 7/10445* (2013.01); *G06K 7/10316* (2013.01); *G06K 7/1413* (2013.01); *G06Q 20/208* (2013.01)

(58) Field of Classification Search
CPC ........... G06K 7/10445; G06K 7/10316; G06K 7/1413; G06Q 20/208
USPC ........................................................ 235/451
See application file for complete search history.

(56) References Cited

U.S. PATENT DOCUMENTS 9,552,539 B2 * 1/2017 Moran ................ G06K 7/0008

* cited by examiner

*Primary Examiner* — Karl D Frech
(74) *Attorney, Agent, or Firm* — Yuri Astvatsaturov (57) ABSTRACT

A method and apparatus for detecting a bulk quantity of RFID tags in a presentation area such as a point-of-sale device. Bulk quantity of RFID tags may be detected according to input to the point-of-sale device including through input from a symbolic barcode scanner, a conveyor belt, a weight scale, and/or via an RF antenna driven at a first power level. After the bulk quantity of RFID tags is detected, the RF antenna is driven at a second, higher power level temporarily to increase bulk RFID tag detection accuracy. "Fringe" tags may be detected by the RF antenna when it is driven at the higher power level that are in the environment but not presented at the point-of-sale device. Fringe tags may be filtered based on RF characterization of the presentation area including driving the RF antenna outside of presentation sessions and/or filtering RFID tags detected across multiple presentation sessions.

27 Claims, 7 Drawing Sheets

BULK RADIO FREQUENCY IDENTIFICATION TAG READING

BACKGROUND OF THE INVENTION

In retail environments, point-of-sale areas must identify products to be purchased for sale by a customer. Point-of-sale devices that detect RFID tags on items presented by a customer at the point-of-sale area may fail to detect all the individual items when many items are presented at once. (bulk presentation). Increasing the power of an RF antenna disposed proximate to the point-of-sale area may expand the range of the RF antenna and falsely detect RFID tags that are not part of the items presented for purchase by the customer. These "fringe" tags may be tags nearby still on sales racks or with another customer near the point of sale area.

Accordingly, there is a need for bulk RFID tag reading at a point-of-sale area that avoids false RFID tag detections.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Implementations described herein include a method of bulk detecting radio frequency identification (RFID) tags including driving a radio-frequency (RF) antenna at a first power level, the RF antenna being positioned in an environment of a point-of-sale device, detecting, at the point-of-sale device, the presence of one or more physical items, each of the one or more physical items having an RFID tag associated therewith, determining whether the one or more physical items satisfy a bulk item condition, driving the RF antenna at a second power level if the one or more physical items satisfy the bulk item condition, the second power level being higher than the first power level, recognizing, by the RF antenna operating according to the second power level, one or more RFID tags embedded in the one or more physical items, and reducing the power level of the RF antenna to the first power level after an expiration of a bulk detection time period.

Figure 1:
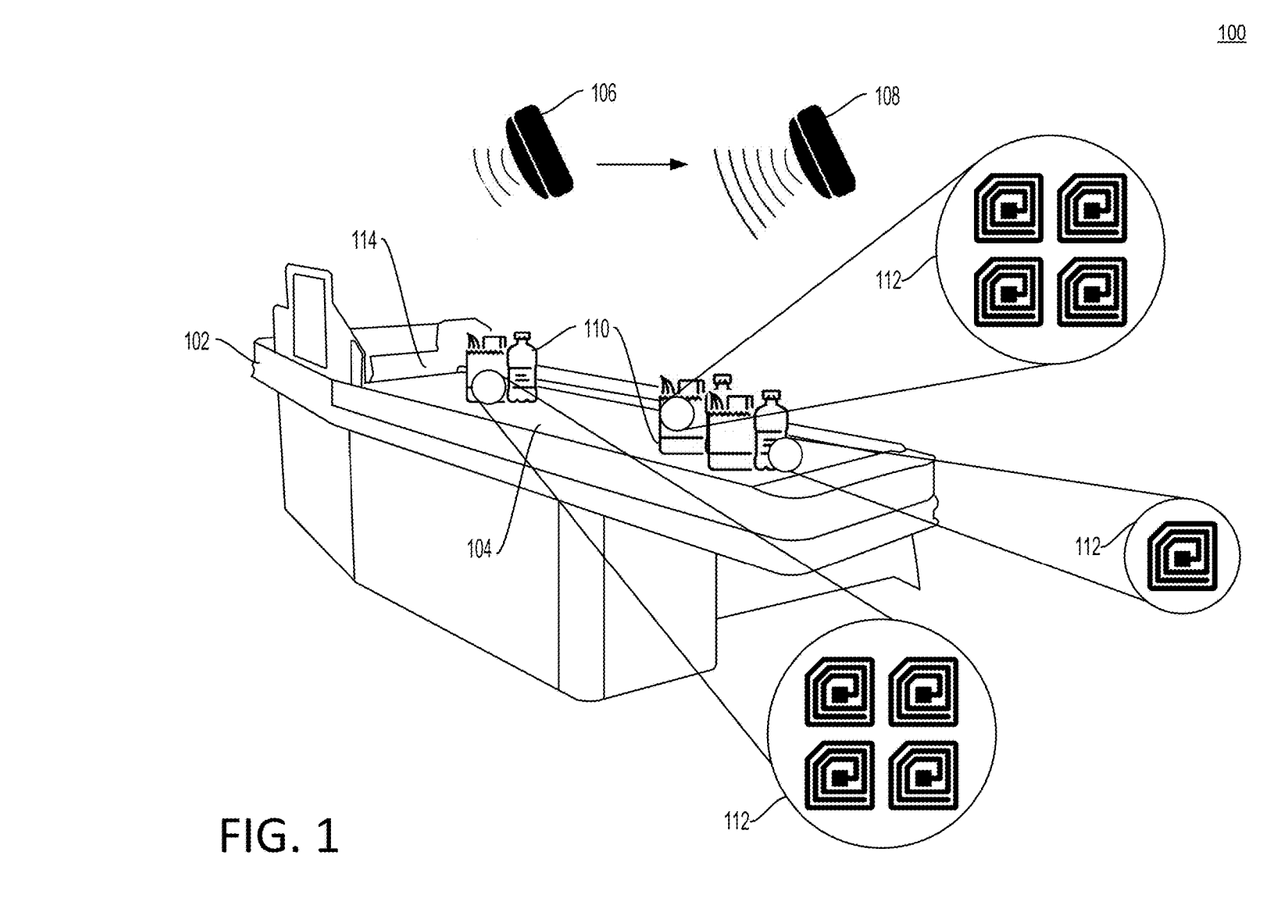
FIG. 1 is a diagram of a system with a point-of-sale area for bulk RFID tag reading in accordance with some embodiments.

FIG. 1 is a diagram of a system with a point-of-sale area 100 for bulk RFID tag reading in accordance with some embodiments. In some implementations, the point-of-sale area 100 is positioned in a checkout area proximate to a retail sales floor where customers can purchase items for sale 110. The point-of-sale area 100 may include a point-of-sale device 102, which may include a counter, a cash register, a point-of-sale tablet, a conveyor belt, and/or other components for processing sales transactions of items 110 to be purchased by a customer. In other implementations, the system 100 for bulk RFID tag reading includes a presentation area 102 that is not a point-of-sale area. Instead, the presentation area 102 may include an area where a person or thing presents items to be inventoried, counted, entered into a ledger, and/or logged (e.g., a return counter, a manufacturing environment, an assembly line, the output of a machine, an inventory manager, etc.).

In implementations, the items for sale 110 include symbolic barcodes printed thereon that may be manually scanned at a terminal 114 of the point-of-sale device 102. The symbolic barcodes may encode information relating to the product, for example without limitation a UPC code for the product. The point-of-sale device 102 may record information encoded on symbolic barcodes on items for sale 110 during a checkout period for a particular customer.

The items for sale 110 include RFID tags 112 embedded therein or thereon. The RFID tags 112 can be detected by an RF antenna 106 disposed proximate to the point-of-sale device 102 in the point-of-sale area 100. The RFID tags 112 may include information regarding the items for sale 110, for example without limitation UPC code, manufacturer information, distribution information, information regarding the contents of the items for sale 110, etc.

Information in the RFID tags 112 may be read and detected by the point-of-sale device 102 and/or other components of the system 100 (including components not shown in FIG. 1) by an RF antenna 106 operating according to a first power level. A magnitude of the first power level of the RF antenna 106 can be chosen based on the environment of the point-of-sale area 100. If the point-of-sale area 100 is near other point-of-sale areas, such as multiple adjacent check-out lines, then there is a risk of detecting RFID tags that are presented for purchase at other point-of-sale areas and not presented at the point-of-sale area 100. There may also be persistent RFID tags 112 in the environment of point-of-sale area 100 (also referred to herein as "fringe" or "environmental" RFID tags), such as RFID tags 112 on items displayed for purchase, abandoned items, or other items having RFID tags not presented for purchase at the point-of-sale area 100. If the first power level of the RF antenna 106 is too high, then persistent RFID tags 112 may be detected. If the first power level of RF antenna 106, on the other hand, is too low, then fewer than all RFID tags 112 that are presented for purchase at the point-of-sale area 100 may be "missed" by the RF antenna 106. In other words, some RFID tags 112 presented for purchase may fail to scan, thus creating an incorrect undercount of the items for purchase 110, especially when a large number of items for purchase 110 are presented at the same time (e.g., a bulk item condition).

The point-of-sale device 102 (or other components of the system not illustrated in FIG. 1) may improve accuracy of RFID tag scanning during a bulk item condition by temporarily driving the RF antenna 106 at a second, higher power level illustrated as RF antenna 108. RF antennas 106 and 108 need not be distinct antennas, but rather may be a single antenna driven at the first power level (106) under normal operation and driven at the second, higher power level (108) when a bulk item condition is detected. In one example implementation, the RF antenna is driven with 1 W of power at the second, higher power level and between 0.1-0.25 W at the first power level. Other power levels may be chosen based on the contents of the environment of the point-of-sale area 100.

The key advantage of only increasing the power when a bulk read event is detected is that the window of reading an unwanted tag is only opened for a short period when the high power is most needed. The chance of reading this tag always exists as RF reflectors such as people and carts are moving nearby, causing constructive and deconstructive effects of the RF. It may be very infrequent that the RF is constructed just right to cause a read of a fringe tag. So we want to be very selective when we open the window.

Increasing a power level of the RF antenna 106 to the second power level (108) decreases the risk of "missing" an RFID tag 112 in an item 110 presented for purchase in the point-of-sale area 100 because an RF antenna 106 driven at a higher power level is more likely to successfully detect an RFID tag in an area than the same RF antenna driven at a lower power level. Driving the RF antenna at the second, higher power level may be viewed as a "spike" to temporarily increase the number of RFID tags that can are successfully read in proximity to point-of-sale device 100 (e.g., items presented for purchase at the point-of-sale device 102).

A time period may be chosen for the length of the power "spike" to the higher power level. In one example implementation, the "spike" lasts 100-400 ms. In another example implementation, the "spike" lasts up to 1 second. Other time periods may also be chosen depending on the characteristics of the environment surrounding the point-of-sale area 100. The longer the RF antenna 106 is spiked, the greater the likelihood of successfully detecting RFID tags 112 that are being presented for purchase at the point-of-sale device 102, but also the greater the likelihood of detecting environmental or fringe RFID tags 112 that are not being presented for purchase, especially if RFID tags 112 in or near the point-of-sale environment 100. A shorter spike is less likely to detect false RFID tags 112, but more likely to miss an RFID tag 112 on an item presented for sale at the point-of-sale device 102.

An RF antenna power spike may be triggered by a determination that items being presented at the point-of-sale device 102 satisfy a bulk item condition. The bulk item condition may be based on a total number of items detected, a total number of items having the same product identifier (e.g., items having the same UPC code), a rate at which items are detected, etc. In some implementations, a terminal 114 at the point-of-sale device 102 includes a symbolic barcode scanner, such as a handheld scanner. When an item is manually scanned at the terminal 114, it can be recorded in a log. The log can be examined to determine a number of items scanned to determine whether the items satisfy a bulk item condition. In other implementations, the RF antenna 106 being driven at the first, lower power level can detect RFID tags 112 to determine whether a bulk item condition exists.

Figure 2:
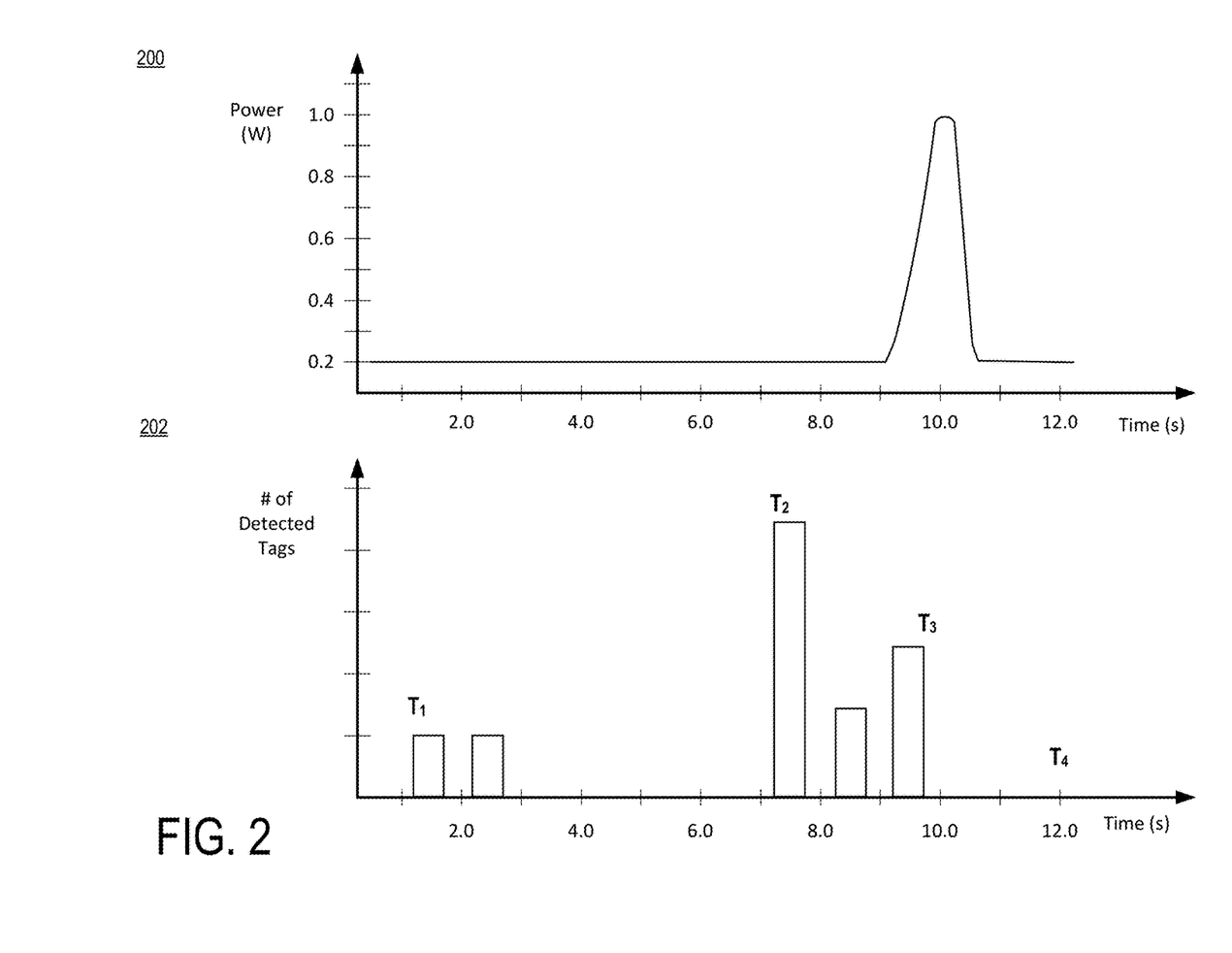
FIG. 2 is a plot of RF antenna power against time and a plot of a number of detected RFID tags against time for a system with a point-of-sale area for bulk RFID tag reading in accordance with some embodiments.

FIG. 2 is a plot 200 of RF antenna power against time and a plot 202 of a number of detected RFID tags against time for a system with a point-of-sale area for bulk RFID tag reading in accordance with some embodiments. The x-axis of plots 200 and 202 are time measured in seconds and represent an excerpt of an item purchasing session at a point-of-sale area. The y-axis of plot 200 indicates the power at which an RF antenna in the environment of the point-of-sale device is being driven. The y-axis of the plot 202 indicates the number of newly detected RFID tags for each 1 second interval during the item purchasing session illustrated by vertical bars. Although an RFID tag may be recognized by the RF antenna for a continuous period of time during the item purchasing session, the plot 202 shows only the time period during which the RFID tag was first detected.

The plot 202 illustrates a bulk item condition being detected by the RF antenna being driven at a first, lower power level during the item purchasing session until the bulk item condition is detected at around 9.0 seconds. The RF antenna is driven at the low power level illustrated as 0.2 W and detects two RFID tags near time $T_1$. At time $T_2$, the RF antenna being driven at 0.2 W detects a larger number of items and again one second later. In the example illustrated in FIG. 2, the number of items detected by time $T_3$ satisfies a bulk items condition. In other implementations, the bulk item condition may be satisfied based on more or fewer items than had been detected at time $T_3$ in the example of FIG. 2.

The RF antenna power spikes around time $T_3$ to briefly reach 1.0 W. At time $T_3$, there is a corresponding increase in the number of RFID tags detected. The RFID tags detected around time $T_3$ may be RFID tags that would not have been detected at the first, lower power level. In some implementations, some or all of the tags detected at the time of the RF antenna power spike are not associated with the point-of-sale area at which the bulk item condition was satisfied (e.g., fringe tags or environmental tags). Any such fringe RFID tags can be filtered from the items deemed to have been presented at the point-of-sale device as explained herein. At time $T_4$, the RF antenna has returned to the low power level and no new RFID tags are detected at the point-of-sale device, illustrating the end of the item purchasing session.

Figure 3:
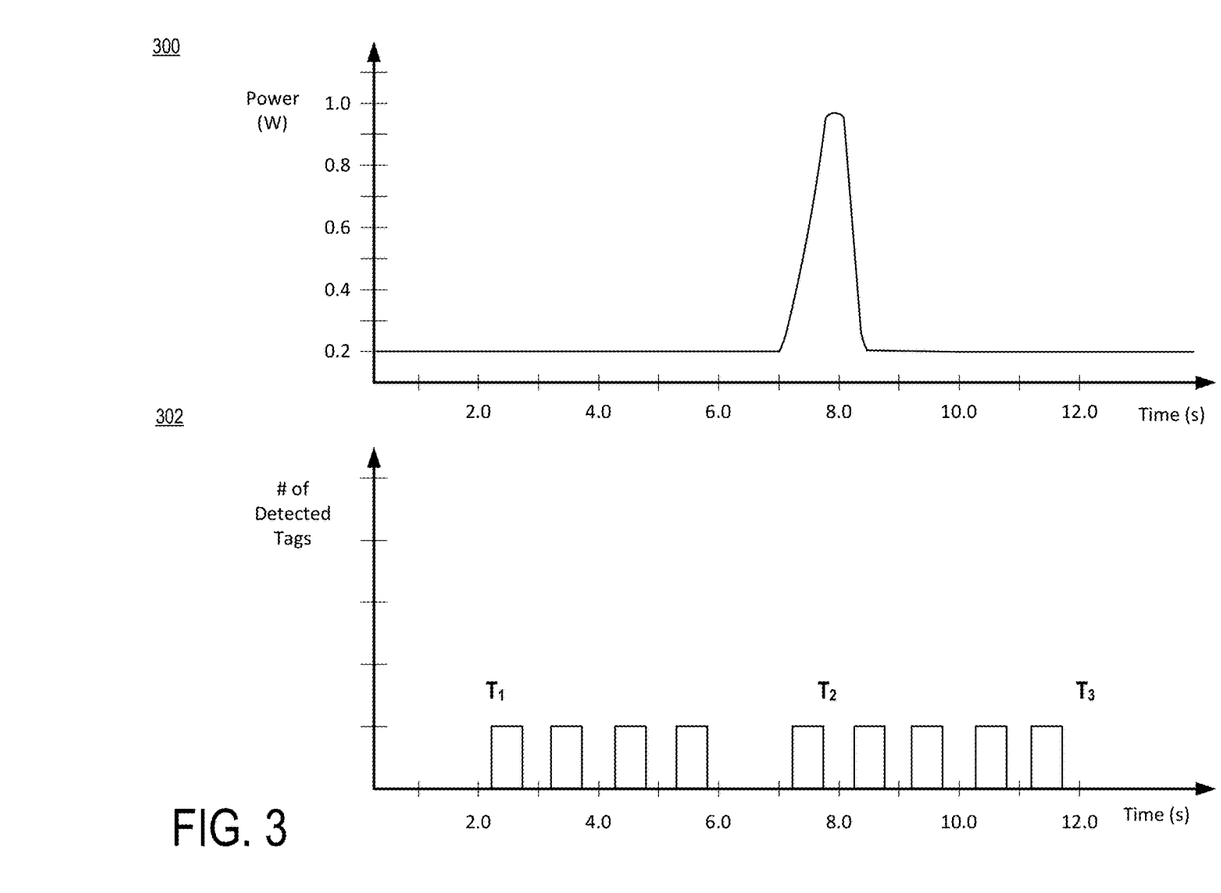
FIG. 3 is another plot of RF antenna power against time and a plot of a number of detected RFID tags against time for a system with a point-of-sale area for bulk RFID tag reading in accordance with some embodiments.

FIG. 3 is another plot 300 of RF antenna power against time and a plot 302 of a number of detected RFID tags against time for a system with a point-of-sale area for bulk RFID tag reading in accordance with some embodiments. The x-axis of plots 300 and 302 are time measured in seconds and represent an excerpt of an item purchasing session at a point-of-sale area. The y-axis of plot 300 indicates the power at which an RF antenna in the environment of the point-of-sale device is being driven. The y-axis of the plot 302 indicates the number of newly detected RFID tags for each 1 second segment internal during the item purchasing session illustrated by vertical bars. Although an RFID tag may be recognized by the RF antenna for a continuous period of time during the item purchasing session, the plot 302 shows only the time period during which the RFID tag was first detected.

The plot 302 illustrates a bulk item condition being detected by a terminal at the point-of-sale device, such as manually via a handheld symbolic barcode scanner, during the item purchasing session. New items are detected approximately every second starting at a time T1. Around time T2, enough items have been detected to satisfy a bulk item condition at the point-of-sale device. When the bulk item condition is detected around time T2, a power level of the RF antenna spikes temporarily. The plot 302 shows additional items being detected by the handheld scanner, but does not show items detected by the RF antenna around the power spike at time T2 or at other times. At time T3, no additional items are scanned and the item purchasing session is ended.

Figure 4:
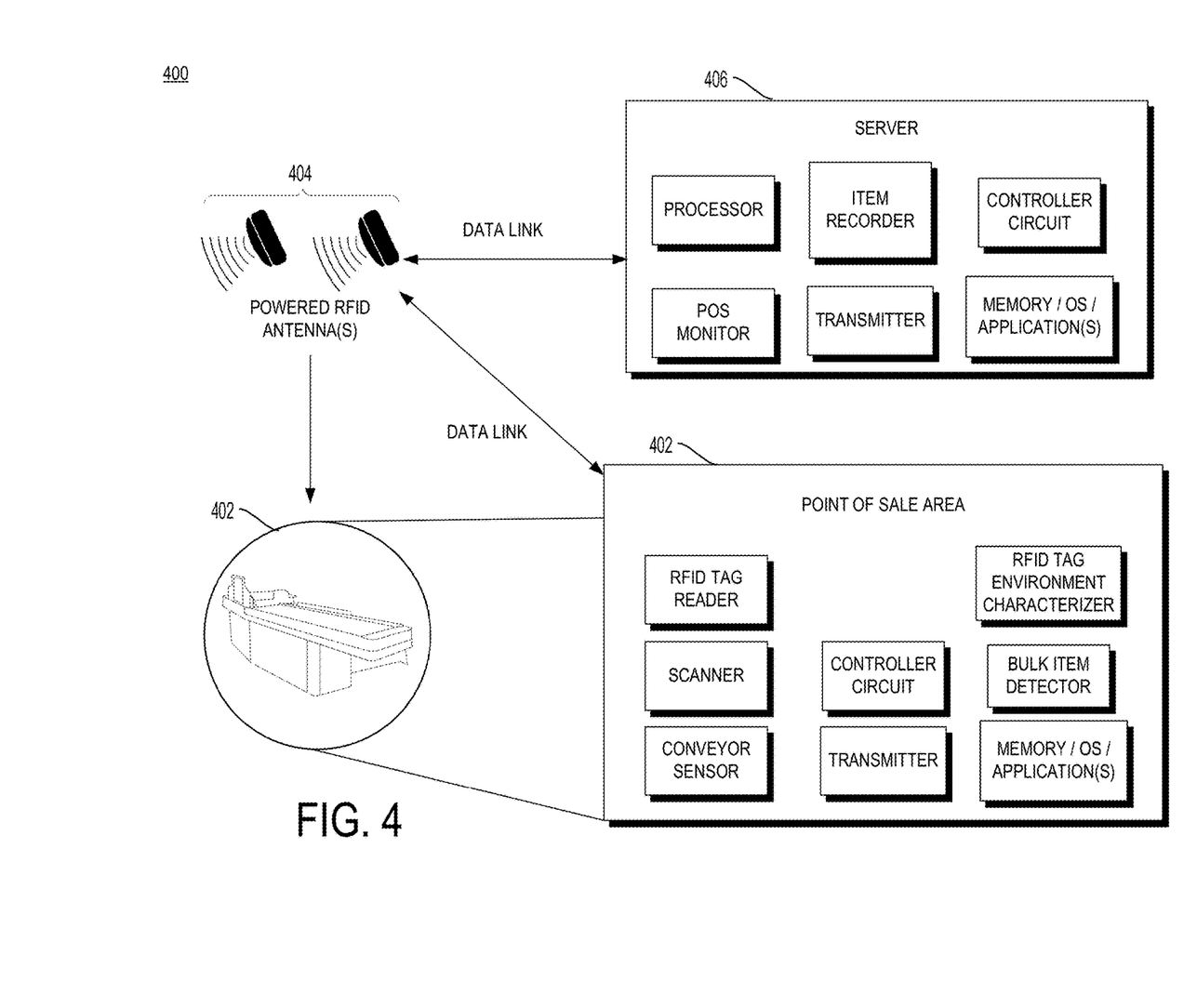
FIG. 4 is a block diagram of a system with a point-of-sale area for bulk RFID tag reading in accordance with some embodiments.

FIG. 4 is a block diagram of a system 400 with a point-of-sale area 402 for bulk RFID tag reading in accordance with some embodiments. The point-of-sale area 402 includes components for detecting a bulk item condition at the point-of-sale area 402 and accurately reading RFID tags associated with the individual items that make up the group of bulk items.

Several components of the point-of-sale area can detect whether a bulk item condition is satisfied. One component for detecting whether a bulk item condition is satisfied is a scanner. The scanner may be incorporated into a terminal of a point-of-sale device located in the point-of-sale area. The scanner may operate manually to scan symbolic barcodes on items presented at the point-of-sale area 402 during a purchasing session and transmit data extracted therefrom to a bulk item detector. If the bulk item detector receives more than a threshold number of items from the scanner during a purchasing session (e.g., items scanned for a single bill), a bulk item condition is detected. The point-of-sale area 402 may include a conveyor sensor for detecting a bulk item condition. The conveyor sensor may transmit data from a weight sensor embedded therein to the bulk item detector. If the weight of items presented at the point-of-sale area 402 exceeds a threshold, then a bulk item condition is detected. One or more RF antennas 404 and RFID tag reader may also detect a bulk item condition. The RF antennas 404 may be driven at a first power level by the controller circuit and the RFID tag reader may detect the bulk item condition when more than a threshold number of RFID tags are detected by the RF antenna 404 at the first power level.

Once a bulk item condition has been detected, the controller may increase a power level of one or more of the RF antennas 404 for a period of time. While the one or more RF antennas 404 are driven at a higher power level, additional RFID tags are likely to be detected that were not detected when the RF antennas 404 were driven at the lower power level. The RFID tag reader may record the data contained in the additional RFID tags and/or transmit the data via a transmitter to other components of the system, such as the server 406.

In some implementations, components of the point-of-sale area 402 are configured to characterize the RFID tag environment of the point-of-sale area 402. There may be persistent or fringe RFID tags within range of the RFID antennas 404 when they are driven at the second, higher power level that are not part of items presented for purchase at the point-of-sale device (e.g., RFID tags on items displayed for purchase, abandoned items, etc.). The controller circuit may periodically drive the RF antennas 404 at the higher power level during environmental characterization periods when there are no bulk item conditions detected and/or when there are no items presented for purchase in the point-of-sale area 402. Fringe RFID tags will appear in more than one of the environmental characterization periods, thus indicating that the tags should not be associated with customer purchases.

Once detected, fringe RFID tags may be transmitted to the server 406 or stored locally at the point-of-sale area 402. In some implementations, an item recorder on the server 406 stores a list of fringe tags in the environment of point-of-sale area 402. When fringe tags in the environment of point-of-sale area 402 are detected while the RF antennas 402 are driven at the second, higher power level, these fringe tags may then be filtered out of a list of RFID tags deemed to have been presented for a transaction at the point-of-sale area 402.

The item recorder on the server 406 may perform other functions of bulk RFID reading as well. When items are presented at the point-of-sale area 402, the item recorder may receive an identification of the presented items via the transmitter from the point-of-sale area 402. The identification of the presented items may originate from a scanner or other component at the point-of-sale device. In some implementations, identifications of items passing through the point-of-sale area 402 are detected by a point-of-sale monitor on the server 406. These items may be compared to another identification of items presented at the point-of-sale device as detected by the RF antennas 404, whether driven at a high or lower power level. There exists therefore a verification by the RF antennas of the items as recorded passing through the point of sale device. Items that pass through the point-of-sale area 402 but are not recorded and placed on a bill by the scanner may be caught by the RF antennas and recorded as having slipped through by the item recorder.

Other components of the server 406 include a controller circuit, a processor, and memory/applications that are configured to analyze information received from other components of the system and to drive the RF antenna at the various power levels.

Figure 5:
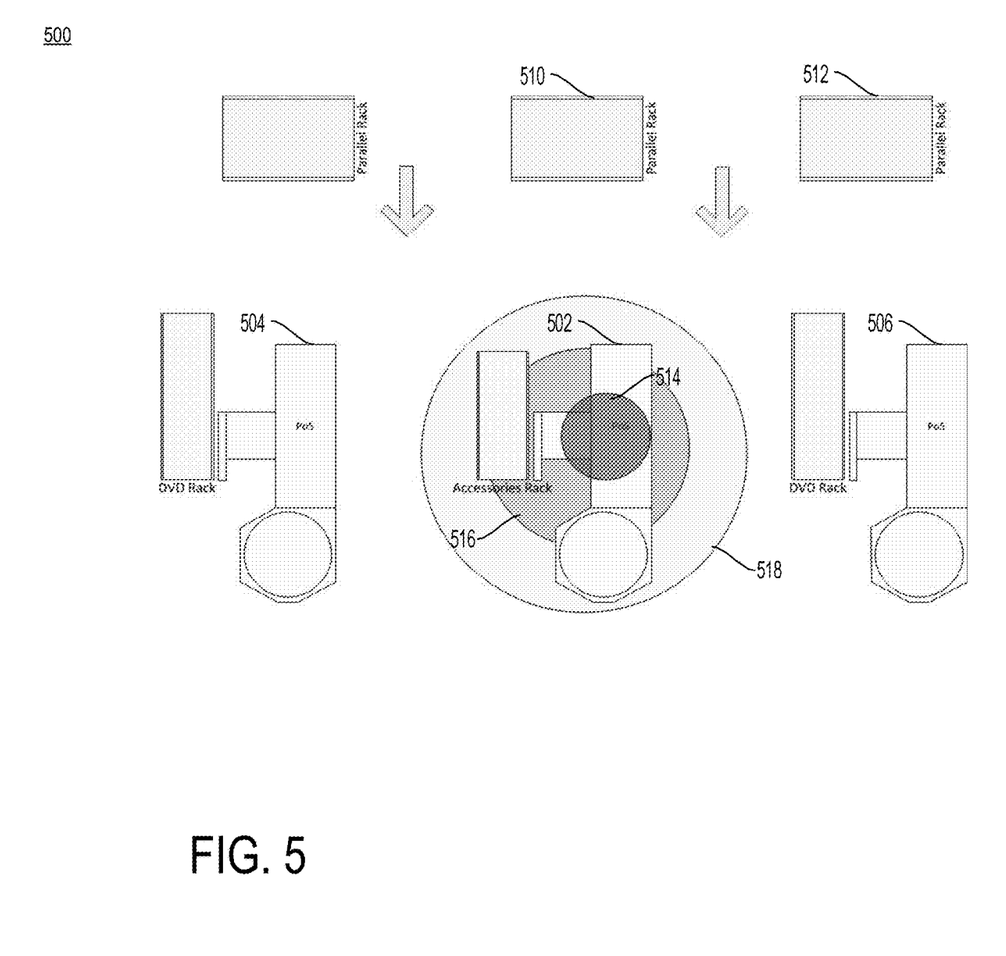
FIG. 5 is a schematic diagram of a system with a point-of-sale area for bulk RFID tag reading of items with the same product identifier in accordance with some embodiments.

FIG. 5 is a schematic diagram of a system 500 with a point-of-sale area 502 for bulk RFID tag reading of items with the same product identifier in accordance with some embodiments. In some implementations, a bulk item condition is satisfied when more than one item having the same product identifier (e.g., the same UPC code) are presented as part of the same transaction at the point-of-sale area 502 (e.g., a customer wishes to buy ten of the same item). As such, a staffer may scan only one of the items with the same product identifier with a manual scanner and enter a remaining number of products manually (e.g., on a keypad at the terminal). In this way, when a customer presents ten identical items, only one is scanned and the remaining nine are recorded via the keypad.

When a bulk item condition is satisfied based on multiple items with the same product identifier, a power of the RF antenna may be increased to read RFID tags associated with the non-scanned items. In some implementations, the power is increased from a first level (represented by the physical range 514) to a second level (represented by the physical range 518) to detect RFID tags associated with the non-scanned items. In some implementations, the power level resulting in the physical range 518 may be too large and could raise a potential of reading RFID tags not presented at the point-of-sale area 502, such as RFID tags associated with the point-of-sale areas 504 and 518 and/or product racks 510 and 512. As such, a third power level represented by the physical range 516 may be substituted to read the RFID tags of the items with the same product identifiers (e.g., same UPC codes) as the scanned item.

Figure 6:
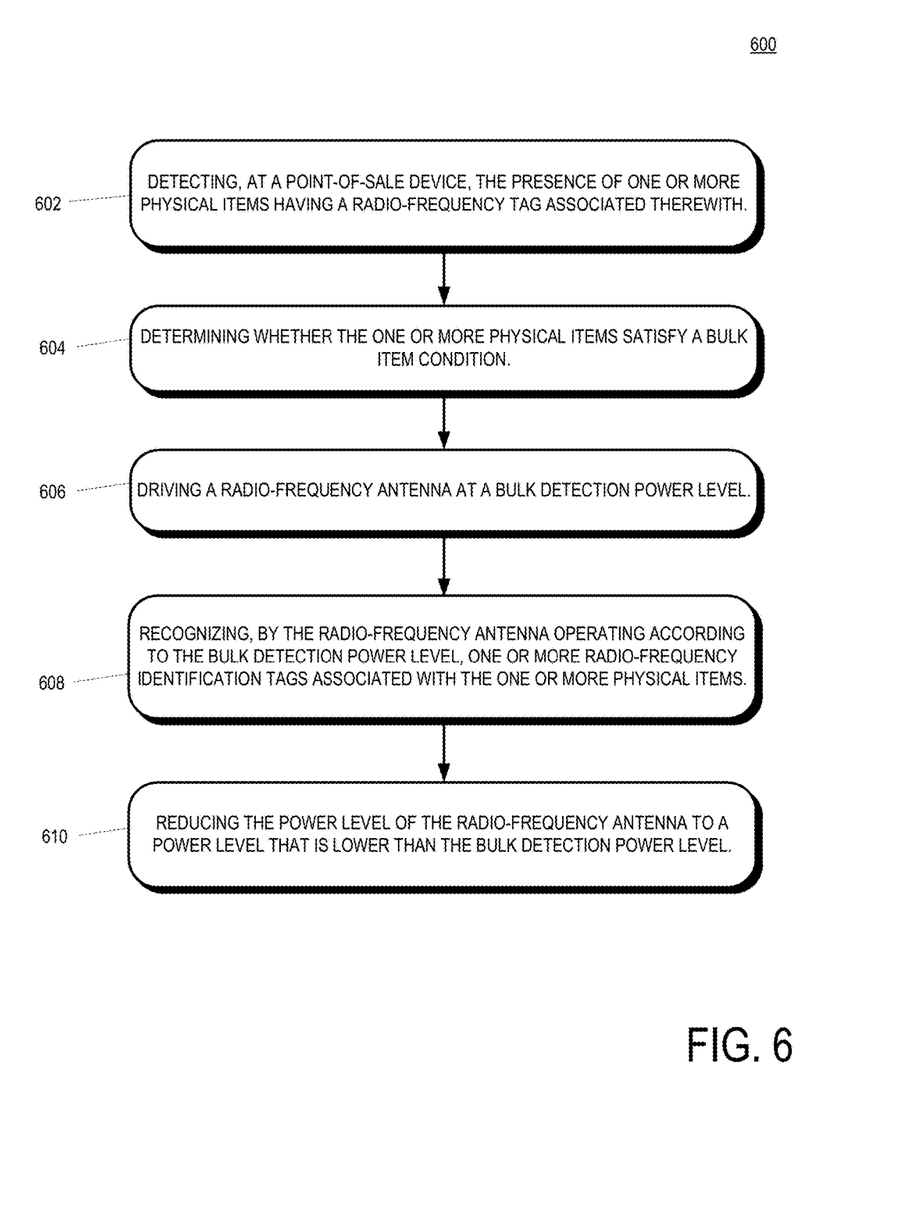
FIG. 6 is a flowchart of a method of bulk detecting radio frequency identification (RFID) tags in accordance with some embodiments.

FIG. 6 is a flowchart of a method 600 of bulk detecting radio frequency identification (RFID) tags in accordance with some embodiments. A detecting operation 602 detects, at a point-of-sale device, the presence of one or more physical items presented for a transaction. The detecting operation may be performed by a scanner for manually scanning symbolic barcodes at a terminal of a point-of-sale device, a conveyor belt activation sensor and/or weight sensor, an RF antenna, etc. or any combinations thereof. A determining step 604 determines whether the one or more physical items satisfy a bulk item condition. A bulk item condition may include a number of items that exceeds a threshold, a total weight of the items that exceeds a threshold, a total sales prices that exceeds a threshold, etc. In some implementations, a bulk items condition is satisfied if more than a threshold number of items have the same product identifier (e.g., the same UPC code).

A driving operation 606 drives an RF antenna at a bulk detection power level. The bulk detection may be a second power level that is higher than a first power level at which the RF antenna was driven before the bulk item condition was detected. A recognizing operation 608 recognizes, by the RF antenna operating according to the bulk detection power level, one or more RFID tags associated with the one or more physical items. The recognizing operation may be performed by a bulk item detector or controller circuit coupled to the RF antenna. A reducing operation 610 reduces the power level of the RF antenna to a power level that is lower than the bulk detection power level. In some implementations, the reducing operation 610 is performed after unique items are no longer detected at the point-of-sale device. In other implementations, the reducing operation 610 is performed after the expiration of a timeout period. In yet other implementations, the reducing operation 610 is performed when a signal is received that a purchasing session has ended.

Figure 7:
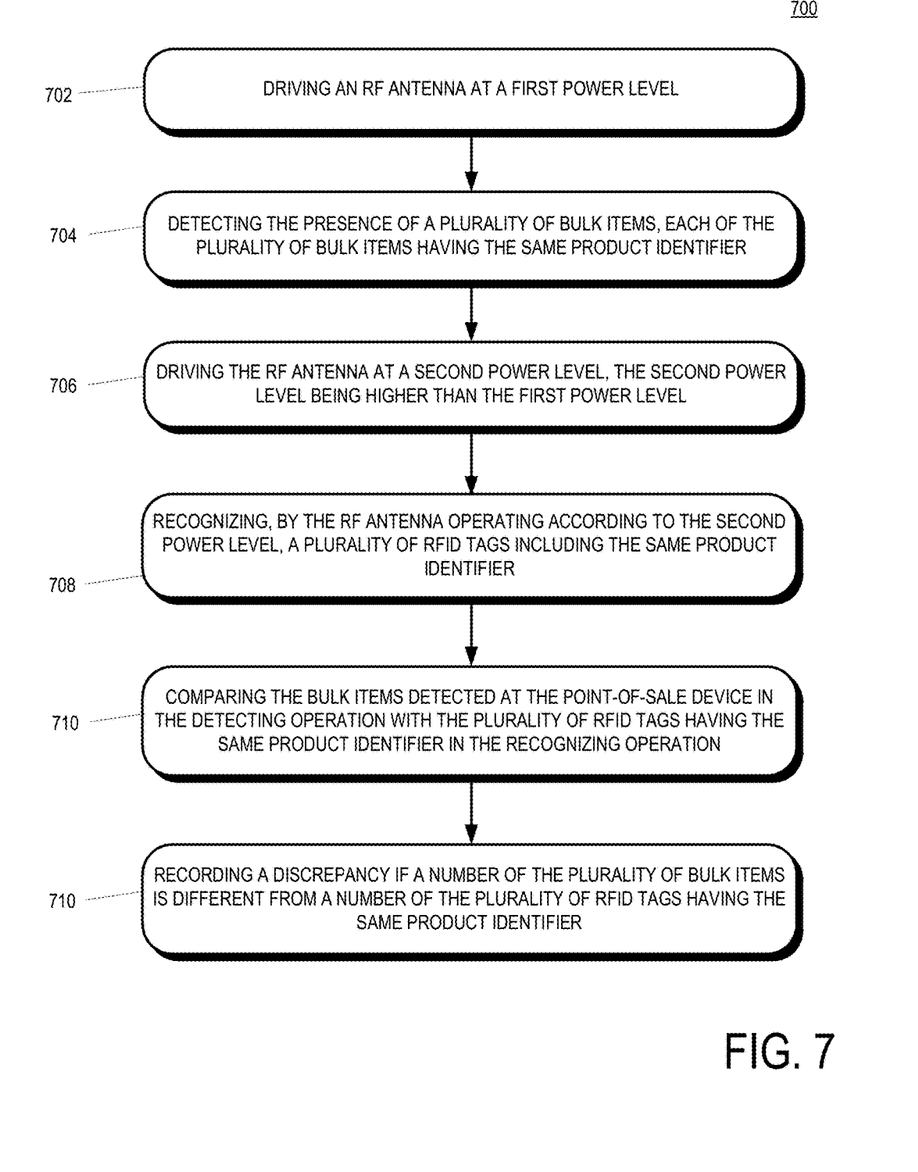
FIG. 7 is a flowchart of a method of characterizing the environment of a point of sale area in accordance with some embodiments.

FIG. 7 is a flowchart of a method 700 of characterizing the environment of a point of sale area in accordance with some embodiments. A driving operation 702 drives an RF antenna at a first power level. A detecting operation 704 detects, at a point-of-sale device, the presence of one or more physical items presented at the point-of-sale device having the same product identifier (e.g., the same UPC code). The detecting operation 704 may be performed by a scanner for manually scanning symbolic barcodes at a terminal of a point-of-sale device, a conveyor belt activation sensor and/or weight sensor, an RF antenna, etc. or any combinations thereof. In some implementations, the detecting operation 704 may be performed by manually scanning one or more items (e.g., manually scanning a symbolic barcode on the item(s)), and subsequently entering a number of remaining items on a keypad or by other input means into the point-of-sale device. For example, if a customer presents ten identical items for purchase at a point-of-sale device, one of the items may be scanned and the remaining items can be accounted for by entering the number nine on a keypad at the terminal.

A driving operation 706 drives the RF antenna at a second power level, the second power level being higher than the first power level. A recognizing operation 708 recognizes, by the RF antenna operating according to the second power level, a plurality of RFID tags including the same product identifier. The recognizing operation 708 may include a filtering sub-operation during which any RFID tags that do not include the same product identifier are filtered.

A comparing operation 710 compares the bulk items detected at the point-of-sale device in the detecting operation with the plurality of RFID tags having the same product identifier in the recognizing operation 708. The comparing operation 710 may detect whether any items that were not accounted for by the manual scanning/entering process described with respect to the recognizing operation 708 and the detecting operation 704 failed to account for some or all of the items presented for transaction. A recording operation 712 records a discrepancy if a number of the plurality of bulk items is different from a number of the plurality of RFID tags having the same product identifier. In some implementations, the recording operation 712 records whether more or fewer items were detected in the detecting operation 704 in comparison to the recognizing operation 708. The detecting operation 704 may include a filter to remove any fringe or persistent RFID tags recognized in the recognizing operation 708 that were not presented for purchase at the point of sale device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of bulk detecting radio frequency identification (RFID) tags, the method comprising:
    driving a radio-frequency (RF) antenna at a first power level, the RF antenna being positioned in a presentation environment;
    detecting, by the RF antenna, the presence of one or more physical items, each of the one or more physical items having an RFID tag associated therewith;
    determining whether the one or more physical items satisfy a bulk item condition;
    driving the RF antenna at a second power level if the one or more physical items satisfy the bulk item condition, the second power level being higher than the first power level;
    recognizing, by the RF antenna operating according to the second power level, one or more RFID tags embedded in the one or more physical items; and
    reducing the power level of the RF antenna to the first power level after an expiration of a bulk detection time period.

2. The method of claim 1, wherein the detecting operation includes detecting the physical presence of the one or more items with a barcode scanner at the presentation environment.

3. The method of claim 1, wherein the detecting operation includes detecting the physical presence of the one or more items with the RF antenna being driving at the first power level.

4. The method of claim 1, further comprising:
    repeatedly recognizing a persistent radio-frequency identification (RFID) tag while the radio-frequency (RF) antenna is being driven at the second power level; and
    filtering the persistent RFID tag from the RFID tags associated with the one or more physical items.

5. The method of claim 1, wherein the bulk detection time period expires after no new RFID tags are recognized by the recognizing operation during a timeout period.

6. The method of claim 1, wherein the bulk detection time period expires after a fixed period of time.

7. The method of claim 1, further comprising:
    signaling for manual singulation of the physical items if the bulk item condition is satisfied.

8. A bulk radio-frequency identification (RFID) tag detection system, the system comprising:
    an RF antenna disposed proximate to a point-of-sale area;
    a bulk item detector configured to determine whether physical items in the point-of-sale area satisfy a bulk item condition;
    a controller circuit configured to drive the RF antenna at a first power level if physical items in the point-of-sale area do not satisfy a bulk item condition, and to drive the radio-frequency antenna at a second power level during a bulk item condition period of time if physical items in the point-of-sale area do satisfy a bulk item condition, the first power level being lower than the second power level; and
    an RFID tag reader coupled to the RF antenna and configured to recognize RFID tags.

9. The system of claim 8, wherein the bulk item condition period of time expires while the bulk item condition is still satisfied.

10. The system of claim 8, wherein the controller circuit is configured to drive the RF antenna.

11. The system of claim 8, wherein RFID tags repeatedly recognized by the RFID tag reader while the radio-frequency antenna is driven at the second power level are filtered out of RFID tags associated with the point-of-sale area.

12. The system of claim 8, further comprising:
    a symbolic barcode scanner configured to recognize physical items in the point-of-sale area, wherein the output from the symbolic barcode scanner is used by the control circuit to determine if physical items in the point-of-sale area satisfy the bulk item condition.

13. The system of claim 8, further comprising:
    a conveyor belt sensor configured to signal to the control circuit whether an item conveyor belt is active at the point-of-sale area, and wherein output from the conveyor belt sensor is used by the control circuit to determine if physical items in the point-of-sale area satisfy the bulk item condition.

14. The system of claim 8, further comprising:
a weight scale configured to signal to the control circuit if the weight of physical items at the point-of-sale area satisfies a weight bulk condition.

15. The system of claim 8, further comprising:
a camera configured to visually detect a bulk item condition and to signal the bulk item condition to the control circuit.

16. A system for characterizing the radio-frequency identification (RFID) environment of a point-of-sale device, the system comprising:
a radio-frequency RF antenna disposed proximate to a point-of-sale area and having a first range when driven at a first power level and a second range when driven at a second power level, the first power level being less than the second power level and the first range being smaller than the second range;
an RFID tag environment characterizer configured to recognize persistent physical items having RFID tags embedded therein in an environment of the point-of-sale area, the persistent physical items being located outside the first range of the RF antenna and inside the range of the second range of the RF antenna; and
a controller circuit configured to drive the RF antenna according to at least the first power level and the second power level, the controller further configured to filter persistent physical items from physical items recognized during bulk item sensing transactions at the point-of-sale area.

17. The system of claim 16, wherein the controller circuit periodically drives the RF antenna at the second power level.

18. The system of claim 16, wherein the controller circuit drives the RF antenna at the second power level based on a minimum rate of item sensing at the point-of-sale area.

19. The system of claim 16, wherein the RFID tag environment characterizer recognizes an RFID tag of a particular persistent physical item if the persistent RFID tag environment characterizer recognizes the RFID tag of the particular persistent physical item during multiple periods during which the RF antenna is driven at the second power level.

20. The system of claim 16, wherein the persistent RFID tag environment characterizer recognizes an RFID tag of a particular persistent physical item if the RFID tag environment characterizer detector recognizes the RFID tag of the particular persistent physical item more than once during a persistence time period.

21. A method of bulk a radio-frequency identification (RFID) tag detection at a point of sale area, the method comprising:
driving a radio frequency (RF) antenna at a first power level, the RF antenna being positioned in an environment of a point-of-sale device;
detecting, at the point-of-sale device, the presence of a plurality of bulk items, each of the plurality of bulk items having the same product identifier and each of the plurality of bulk items having a (RFID) tag associated therewith, each RFID tag including the same product identifier; driving the RF antenna at a second power level, the second power level being higher than the first power level;
recognizing, by the RF antenna operating according to the second power level, a plurality of RFID tags including the same product identifier;
comparing the bulk items detected at the point-of-sale device in the detecting operation with the plurality of RFID tags having the same product identifier in the recognizing operation; and
recording a discrepancy if a number of the plurality of bulk items is different from a number of the plurality of RFID tags having the same product identifier.

22. The method of claim 21, wherein the recording operation includes signaling to an operator of the point-of-sale device that fewer than all bulk items detected in the detecting operation were recognized by the RF antenna operating according to the second power level.

23. The method of claim 21, wherein the recording operation excludes fringe RFID tags having the same product identifier detected in more than one recognizing operation over a period of time.

24. The method of claim 23, wherein fringe RFID tags are detected by the RF antenna being driven at a third power level.

25. The method of claim 21, wherein the same product identifier includes a UPC code.

26. The method of claim 21, wherein the detecting operation includes manually scanning at least one of the plurality of bulk items at the point-of-sale device.

27. The method of claim 26, wherein the detecting operation further includes manually entering a number of the plurality of bulk items at the point-of-sale device.

* * * * *